United States Patent
Firth (10) Patent No.: US 10,039,262 B2
(45) Date of Patent: Aug. 7, 2018

(54) LIVESTOCK HEAD HOLDER WITH SINGULAR OPERATING LEVER FOR CLOSING, UNLOCKING AND OPENING SAME

(71) Applicant: Northquip Inc., Woodlands (CA)

(72) Inventor: Philip Malcolm Firth, Woodlands (CA)

(73) Assignee: Northquip Inc., Woodlands (CA)

( * ) Notice: Subject to any disclaimer, the term of this patent is extended or adjusted under 35 U.S.C. 154(b) by 0 days.

(21) Appl. No.: 15/797,403

(22) Filed: Oct. 30, 2017

(65) Prior Publication Data

US 2018/0055004 A1 Mar. 1, 2018

(30) Foreign Application Priority Data

Nov. 15, 2016 (WO) ................ PCT/CA2016/051329

(51) Int. Cl.
    *A01K 1/062* (2006.01)
    *A01K 1/06* (2006.01)

(52) U.S. Cl.
    CPC ............ *A01K 1/062* (2013.01); *A01K 1/0613* (2013.01)

(58) Field of Classification Search
    CPC ......... A01K 1/06; A01K 1/0613; A01K 1/062
    USPC ................ 119/729, 734, 735, 736
    See application file for complete search history.

(56) References Cited

U.S. PATENT DOCUMENTS

| | | | | |
|---|---|---|---|---|
| 2,680,425 A | * | 6/1954 | Nagel | A61D 3/00 119/737 |
| 3,030,921 A | * | 4/1962 | Sanderson | A01K 1/0613 119/736 |
| 3,720,187 A | * | 3/1973 | McDonough | A01K 1/0613 119/734 |
| 4,059,073 A | | 11/1977 | Roark | |
| 5,184,572 A | * | 2/1993 | Meier | A01K 1/0613 119/733 |
| 2006/0191492 A1 | * | 8/2006 | Ross | A01K 1/0613 119/734 |

FOREIGN PATENT DOCUMENTS

GB      837970 A * 6/1960 ........... A01K 1/0613

\* cited by examiner

*Primary Examiner* — Lisa L Tsang
(74) *Attorney, Agent, or Firm* — Kyle R Satterthwaite; Ryan W Dupui; Ade & Company Inc (57) ABSTRACT

A livestock head holder features a top holding member, a bottom holding member and an intermediate link connecting same. An operating lever connected to the bottom holding member so that downward pulling of the operating lever performs a closing stroke of the head holder that swings both holding members into place against the animal's neck. A lock and release mechanism automatically blocks the linkage from performing a reverse opening stroke that withdraws the holding members away from one another under raising of the operating lever. The operating lever is arranged to release the locking action during initial raising of lever to enable completion of the opening stroke, thereby using the same lever for all opening, closing and unlocking functions, whereas prior designs required a separate lock-release mechanism.

20 Claims, 6 Drawing Sheets

LIVESTOCK HEAD HOLDER WITH SINGULAR OPERATING LEVER FOR CLOSING, UNLOCKING AND OPENING SAME

CROSS-REFERENCE TO RELATED APPLICATIONS

This application claims benefit under 35 U.S.C. 119(a) of International PCT Application No. PCT/CA2016/051329, filed Nov. 15, 2016, the entirety of which is incorporated herein by reference.

FIELD OF THE INVENTION

The present invention relates generally to livestock handling equipment, and more particularly to a livestock head holder of a type useful on the head gate of a livestock squeeze chute to provide additional restraint of the animals head for the purpose of ear-tagging, oral inspection (mouthing), etc.

BACKGROUND

Figure 1:
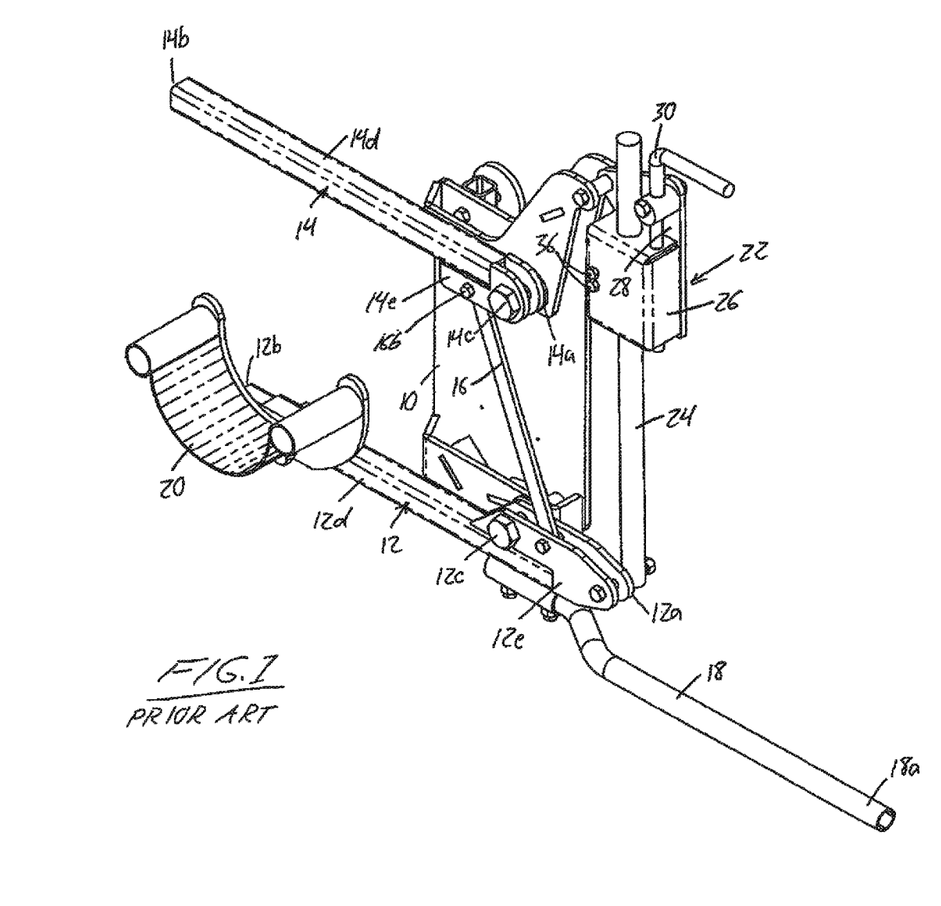
FIG. 1 is a perspective view of a prior art livestock head holder for mounting on the head gate of a livestock squeeze chute.

Applicant currently markets a livestock head holder of the aforementioned type, which is illustrated in FIG. 1. Top and bottom closing members respectively act against the top and bottom of the animal's neck to hold the animal's head in place, for example to restrain the animal's head during ear tagging, oral examination (mouthing), etc. The head holder features a frame 10 mounted to the head gate of a squeeze chute (not shown), and a linkage in which the two holding members 12, 14 are connected by an intermediate link 16 and moved via an operating lever 18. The operating lever 18 is affixed to the bottom holding member 12 to reach outward therefrom at a first end 12a thereof opposite a U-shaped neck-cradle 20 that is carried at an opposed working end 12b of the bottom holding member 12 to fit against the underside of the animal's neck.

The drawing shows the prior art head holder apparatus in a closed state in which both holding members span laterally outward from the frame in a common direction so that the cradle 20 of the bottom holding member resides below the top holding member 14 near the working end 14b thereof in an orientation opening upwardly theretoward. The operating lever 18 is used to transition to the apparatus to this illustrated closed state from an initially opened state in which the top and bottom holding members instead reach upward and downward from the top and bottom of the frame in nearly vertical orientations. To perform the closing stroke that transitions the linkage from the open state to the closed state, the free end 18a of the operating lever 18 pulled downwardly from its initial position reaching upward from the first end of the upright bottom holding member. This swings the bottom holding member 12 into the laterally reaching orientation of the illustrated closed state to brace the attached neck-cradle 20 against the underside of the animal's neck. During this closing stroke of the head holder, the intermediate link 16 causes the top holding member 14 to simultaneously swing down against the topside of the animal's neck, thereby firmly holding the neck in a stationary position between the holding members 14, 16 to restrain head movement of the animal.

So that exertion of force against the holding members by attempted movement by the animal will not open the head holder, a lock and release mechanism 22 automatically locks the linkage to block movement thereof in a reverse opening stroke that would otherwise allow the holding members to move away from one another toward the opened state. The lock and release mechanism 22 features a shaft 24 whose lower end is pivotably pinned to the bottom holding member 12. The shaft 24 passes upwardly through a lock housing 26 carried on a mounting plate 28 that is pivotably pinned to the top end of the frame 10. Inside the lock housing 26, the shaft 24 passes through an opening in a locking plate that is spring-biased into a tilted locking position in which the perimeter edge of the plate's opening bites against the periphery of the shaft to lock the shaft against upward movement through the lock housing 26. This locks the linkage against opening, as the opening stroke requires lifting the free end of the operating lever, would in turn attempts to force the shaft 24 upwardly. The locked state of the shaft 24 prevents such upward movement, thus preventing the operating handle from being lifted to initiate the opening stroke.

Opening of the head holder thus requires temporary release of the locking action, which is achieved by pulling upward on a release pin 30 that projects upwardly out of the lock housing 26 at the upper end thereof. Inside the lock housing, one end of the locking plate is pivotably supported between a pair of locating pins 36 that cross horizontally through the lock housing, while the other end of the lock plate engages with a circumferentially-recessed reduced-diameter area of the release pin 30. As a result, manual lifting the release pin 30 overcomes the resistance of a spring that is coiled around the release pin 30 between the top wall of the housing and the locking plate in order to raise this pin-engaged end of the locking plate. This lifting of the release pin 30 thus straightens out the locking plate into a lock-releasing position perpendicular to the shaft, whereupon the shaft can slide freely through the opening in the lock plate.

From the forgoing, it will be appreciated that the prior art head holder requires two separate input actions by the operator in order to open the apparatus, namely manual lifting of the release pin 30 to release the locked state of the linkage, and a separate lifting of the operator lever 18 with the other hand to perform the opening stroke.

It would be desirable to provide a livestock head holder with a simplified unlock and opening procedure.

SUMMARY OF THE INVENTION

According to a first aspect of the invention, there is provided a livestock head holder comprising:
a frame;
a linkage comprising:
a top holding member pivotably coupled to the frame proximate a first end of the top holding member;
a bottom holding member coupled to the frame proximate a first end of the bottom holding member;
an operating lever connected to the bottom holding member to extend outwardly from the first end thereof so downward pulling of a free end of the operating lever performs a closing stroke of the head holder that swings an opposing working end of the bottom holding member upwardly to brace against an underside of an animal's neck; and
an intermediate link having an upper end pivotably coupled to the top holding member and a lower end pivotally coupled to the bottom holding member so as to swing a working end of the top holding member downwardly during the closing stroke;

a lock and release mechanism arranged to normally perform a locking action preventing the linkage from performing a reverse opening stroke effected by raising the free end of the operating lever to withdrawing the working ends of the holding members away from one another to release the animal's neck;

wherein the operating lever is arranged to release the locking action during initial raising of the free end of the operating lever in order to enable completion of the opening stroke.

Preferably the lock and release mechanism comprises:
a shaft;
a lock carrier;
a locking member carried by the lock carrier, having an opening through which the shaft extends and being biased into a tilted locking position in which a perimeter edge of the opening is in biting engagement with the shaft;
a release member arranged to force the locking member out of the tilted locking position during said initial raising of the free end of the operating lever and into a release position disengaged from the shaft.

Preferably the release member reaches downwardly from the locking member toward the bottom holding member to receive an upward force on the release member at a lower end thereof during said initial raising of the free end of the operating lever.

Preferably the locking device further comprises a cam carried on the operating lever and arranged to act against the release member in a direction forcing the locking member out of the tilted locking position and into the release position during said initial raising of the free end of the operating lever.

Preferably the cam comprises a concave curvature at a camming surface thereof over which the release member travels during the opening stroke to maintain the locking member in the release position throughout said opening stroke.

Preferably the shaft has a pivotable connection to the frame and hangs downwardly from said pivotable connection, the lock carrier is pivotally coupled to the bottom holding member, and the titled locking position of the locking member blocks upward sliding of the lock carrier along the shaft.

Preferably the operating lever is arranged for limited upward tilting of the free end thereof relative to the bottom holding member to a predetermined limit at which the bottom holding member starts moving with the operating lever to initiate the opening stroke, said limited upward tilting acting to release the locking action and allow the opening stroke, preferably by driving the release member to a raised position forcing the locking member out of the tilted locking position and into the release position.

Preferably the operating lever is pivotally pinned to the bottom holding member to enable the limited upward tilting of the operating lever relative thereto.

Preferably a protruding stop and a cooperating opening are defined on opposing ones of said bottom holding member and said operating lever, the protruding stop reaching into the opening and being sized and shaped relative thereto to allow but limit the upward tilting of the operating lever relative to the bottom holding member.

Preferably the opening is defined by the end of a hollow tubular member affixed to a respective one of either the bottom holding member or the operating lever.

Preferably the protruding stop is an L-shaped stop having a first leg protruding outwardly from the respective one of either the bottom holding member or the operating lever, and a second leg reaching therealong.

Preferably the protruding stop is defined on the bottom holding member and the cooperating opening is defined on the operating lever.

According to a second aspect of the invention, there is provided a livestock head holder comprising:
a frame;
a top holding member pivotally coupled to the frame proximate a first end of the top holding member;
a bottom holding member coupled to the frame proximate a first end of the bottom holding member
an operating lever connected to the bottom holding member to extend outwardly from the first end thereof so that downward pulling of a free end of the operating lever performs a closing stroke of the head holder that swings an opposing working end of the holding member upwardly to brace against an underside of an animal's neck; and
an intermediate link having an upper end pivotally coupled to the top holding member and a lower end pivotally coupled to the bottom holding member so as to swing a working end of the top holding member downwardly during the closing stroke actuated by the operating lever; and
a lock and release mechanism comprising:
  a shaft having a pivotable connection to the frame and hanging downwardly from said pivotable connection;
  a lock carrier pivotally coupled to the bottom holding member;
  a locking member carried by the lock carrier, said locking member having an opening through which the shaft extends and being biased into a tilted locking position in which a perimeter edge of the opening bites onto the shaft to prevent upward sliding of the lock carrier along the shaft and thereby prevent movement of the linkage in a reverse opening stroke;
  a release member engaged with the locking member and reaching downwardly from the locking member toward the bottom holding member; and
  a cam carried by the operating lever and having a camming surface facing the release member for contact with a lower end thereof to act upwardly thereagainst during initial raising of the free end of the operating lever to thereby lift the release member into a raised position forcing the locking member out of the tilted locking position and into a release position allowing initiation of the opening stroke, said camming surface being shaped to maintain the raised position of the release member and the release position of the locking member throughout continued raising of the free end of the operating lever to complete the opening stroke.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figures 2, 2A:
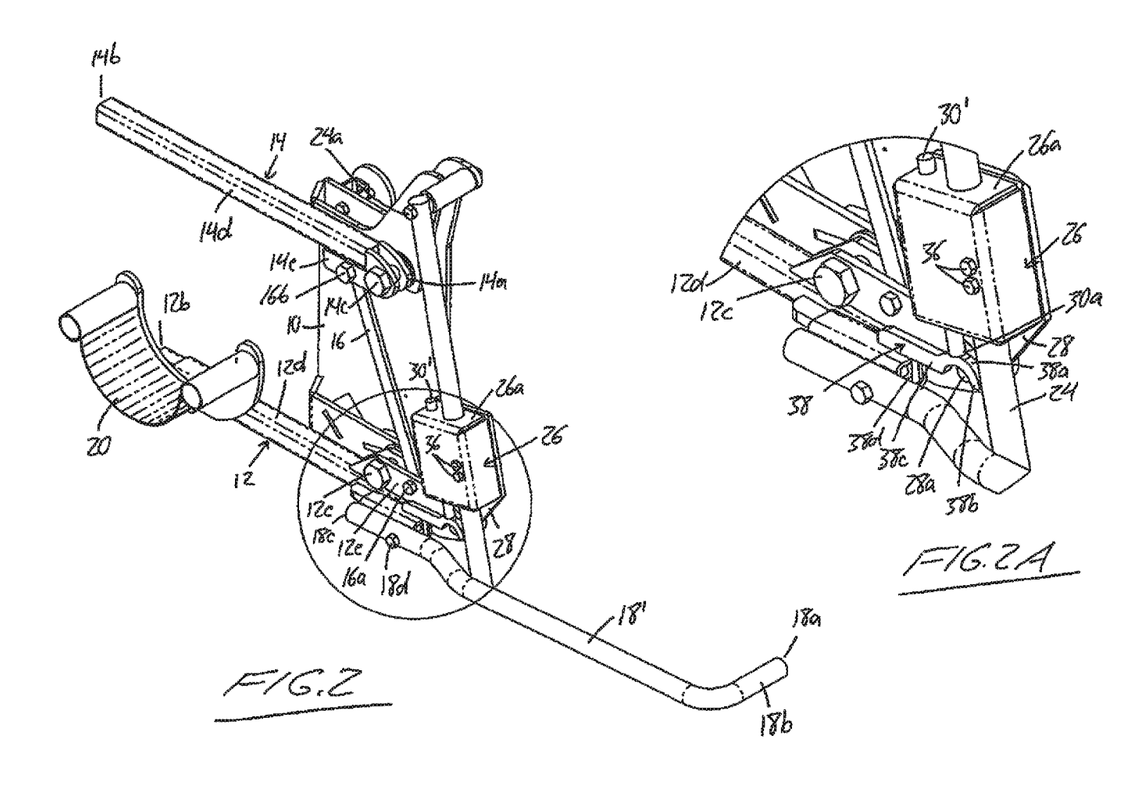
FIG. 2 is a perspective view of a livestock head holder of the present invention featuring a unique lock and release mechanism by which unlocking and opening of the head holder out of the closed state shown in the figure requires only a single action on the same operating lever that is used to close the head holder.
FIG. 2A is a close-up view of the encircled area of the livestock head holder of FIG. 2, showing details of the lock and release mechanism thereof.

FIG. 2 illustrates a livestock head holder apparatus of the present invention, which features the same frame 10, bottom holding member 12, top holding member 14 and intermediate link 16 as the prior art apparatus of FIG. 1. The top holding member 14 has a first end 14a and an opposing second working end 14b. Near its first end 14a, the top holding member 14 is pivotally coupled to the frame 10 near an upper end thereof by a respective pivot pin 14c. The bottom holding member 12 also has a first end 12a and an opposing second working end 12b. Near its first end 12a, the bottom holding member 12 is pivotally coupled to the frame 10 near a lower end thereof by a respective pivot pin 12c. The U-shaped neck cradle 20 is affixed to the bottom holding member 12 near the working end thereof. Both holding members are pivotally pinned to the frame 10 at a front side thereof by their respective pivot pins, and in the closed state of FIG. 2, both holding members span laterally outward from the frame in a common direction so that the neck cradle 20 of the bottom holding member resides below the top holding member 14 near the working end 14b thereof in an orientation opening upwardly theretoward. Accordingly, in the closed state, the top holding member and the neck cradle 20 of the bottom holding member 12 brace against the topside and underside of the animals neck to restrain and stabilize the animal's head in the same manner as the prior art apparatus.

The intermediate link 16 has its lower end pivotally coupled to the bottom holding member 12 by pivot pin 16a at a location between the bottom holding member's pivot pin 12c and first end 12a. The upper end of the intermediate link 16 is pivotally coupled to the top holding member 14 by pivot pin 16b at a location between the top holding member's pivot pin 14c and working end 14b, but closer to the pivot pin 14c and the first end 14a than to the working end 14b. Since the intermediate link 16 is thus connected to the top and bottom holding members on opposite sides of their respective pivot pins, it will cause the top holding member 14 to automatically swing in an opposite direction to the bottom holding member 12 when the bottom holding member 12 is swung about its respective pivot pin 12c. So far, the described installation of the top and bottom holding members and the intermediate link within the linkage is the same as in the prior art.

As in the prior art, and as shown in the drawings, each holding member may be made up of a linear length of square metal tubing 12d, 14d and a respective metal bracket 12e, 14e welded or otherwise rigidly affixed to the tubing to define the first end 12a, 14a of the respective holding member. The bracket 12e, 14e of each holding member also defines the respective mounting point at which the holding member is coupled to the frame 10 by the respective pivot pin 12c, 14c, and also the respective connection point at which the intermediate link 16 is connected to the holding member by its pivot pin 16a, 16b. The pivot pins 12c, 14c, 16a, 16b coupling the holding members to the frame and coupling the intermediate link to the holding members are all oriented horizontally, and lie parallel to one another and perpendicular to the vertical plane of the frame 10, whereby these pins enable movement of the linkage within a vertical working plane parallel and adjacent to the frame 10.

Like in the prior art of FIG. 1, the operating lever 18' is once again connected to the bottom holding member 12 in a manner reaching outwardly beyond the first end 12a thereof, whereby the free end 18a of the lever forms a handle for manual actuation of the linkage movement via the lever 18'. However, the operating lever 18' is not rigidly attached to the bottom lever, unlike FIG. 1 where the lever 18 is bolted to the metal tubing 12d of the bottom holding member to remain rigidly fixed thereto. Instead, the operating lever 18' of the present embodiment is pivotally connected to the bottom holding member 12 to allow a small degree of pivotable movement relative thereto. The manner and purpose of this movable pivot connection between the operating lever and the bottom holding member is described in detail further below. The operating lever 18' of the illustrated embodiment also differs from the prior art of FIG. 1 by having a perpendicular bend 18b near the free end 18a to enable comfortable gripping of the lever from different operator stances.

Like that of the prior art, the lock and release mechanism 22' once again features a shaft 24, a lock housing 26 carried on a mounting plate 28, a release pin 30', and a tiltable locking plate 32 biased into a tilted locking position by a spring 34 coiled around the release pin 30'. The locking plate 32 and spring 34 are shown in the cross-sectional views of FIGS. 5A and 5B. However, the manner in which these components are installed and in which they cooperate with other components is distinguished over the prior art, and affords a new convenient unlock functionality lacking in the prior art design.

Figure 4:
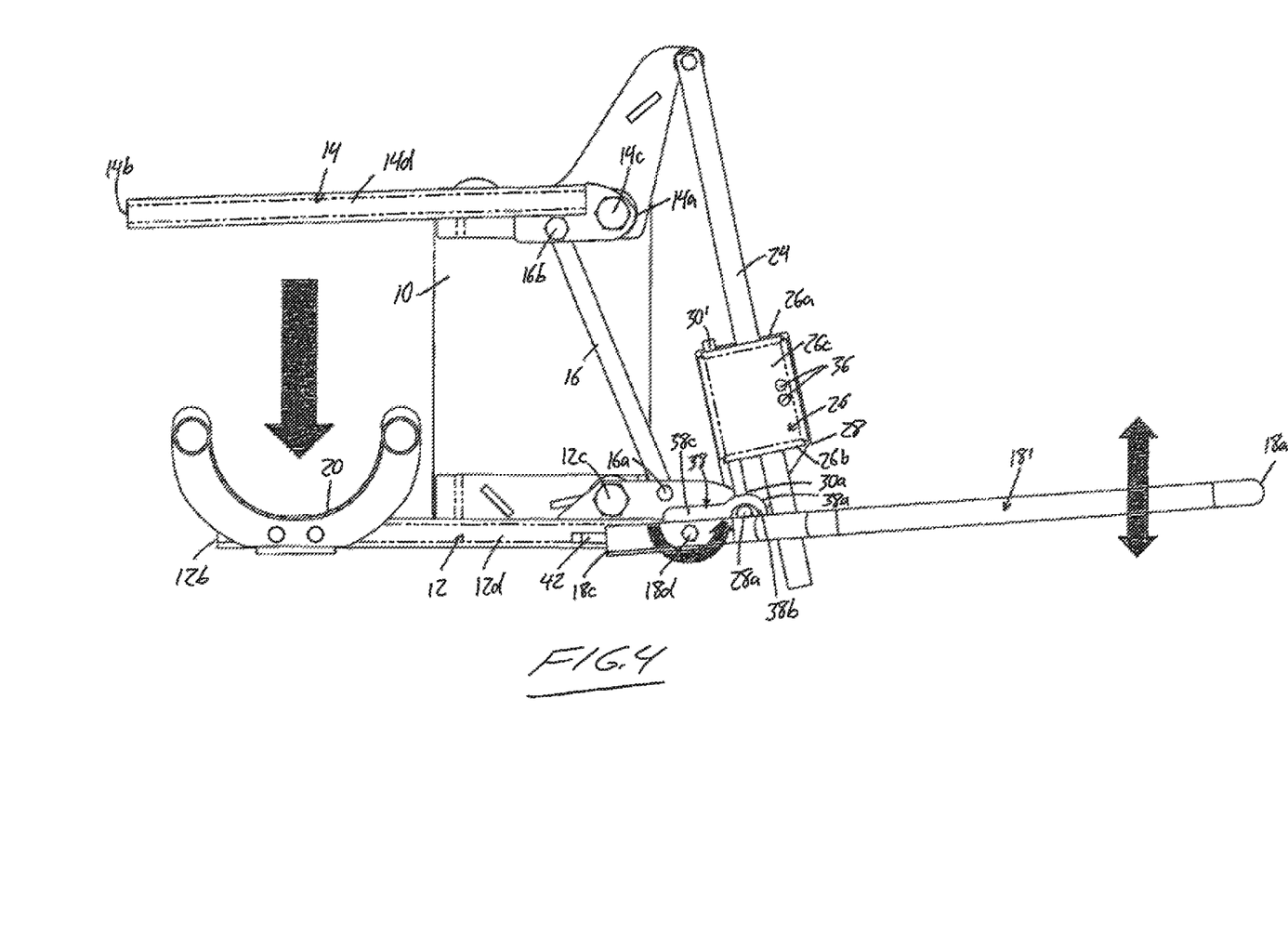
FIG. 4 is an elevational view of the livestock head holder of FIG. 2.

Firstly, with reference to FIG. 2 or 4, the shaft 24 is not connected to the bottom holding member 12 like in the prior art, but instead is pivotally connected to the frame 10 at an upper corner thereof by a respective pivot pin 24a lying parallel to the other pivot pins. The shaft 24 hangs downwardly from its pivotable connection at a side of the frame opposite that to which the holding members laterally extend in the closed state of the head holder. Secondly, the mounting plate 28 and attached lock housing 26 are pivotally connected to the bottom holding member 12 adjacent the first end 12a thereof by another pivot pin 28a lying parallel to the other pivot pins. The lock housing 26 and mounting plate 28 thus cooperatively form a lock carrier by which the locking components in the housing are pivotally carried on the bottom holding members. However, it will be appreciated that this carrier need not necessarily employ a fully enclosed housing.

The release pin 30' of the present embodiment is linear over its entire span, unlike the L-shaped release pin 30 in the prior art of FIG. 1 where the perpendicularly bent portion of the release pin outside the lock housing 26 at the top end thereof was needed to form a manual actuation handle for upward pulling of the release pin to unlock the linkage. In the present embodiment, an actuation end 30a of the release pin 30' instead resides outside the lock housing 26 at the lower end thereof. Accordingly, the lock and release mechanism is inverted relative to that of the prior art, as the shaft has a pivotable connection from which it hangs at its top end instead of standing upright from a pivotable connection at its bottom end, the lock housing is carried on the bottom holding member instead of at the top of the frame, and the actuating end of the release pin is below the lock housing, not above it. In the present embodiment, movement of the bottom holding member displaces the lock housing along the shaft, whereas in the prior art, movement of the bottom holding member displaced the shaft through the lock housing.

Figures 5A, 5B:
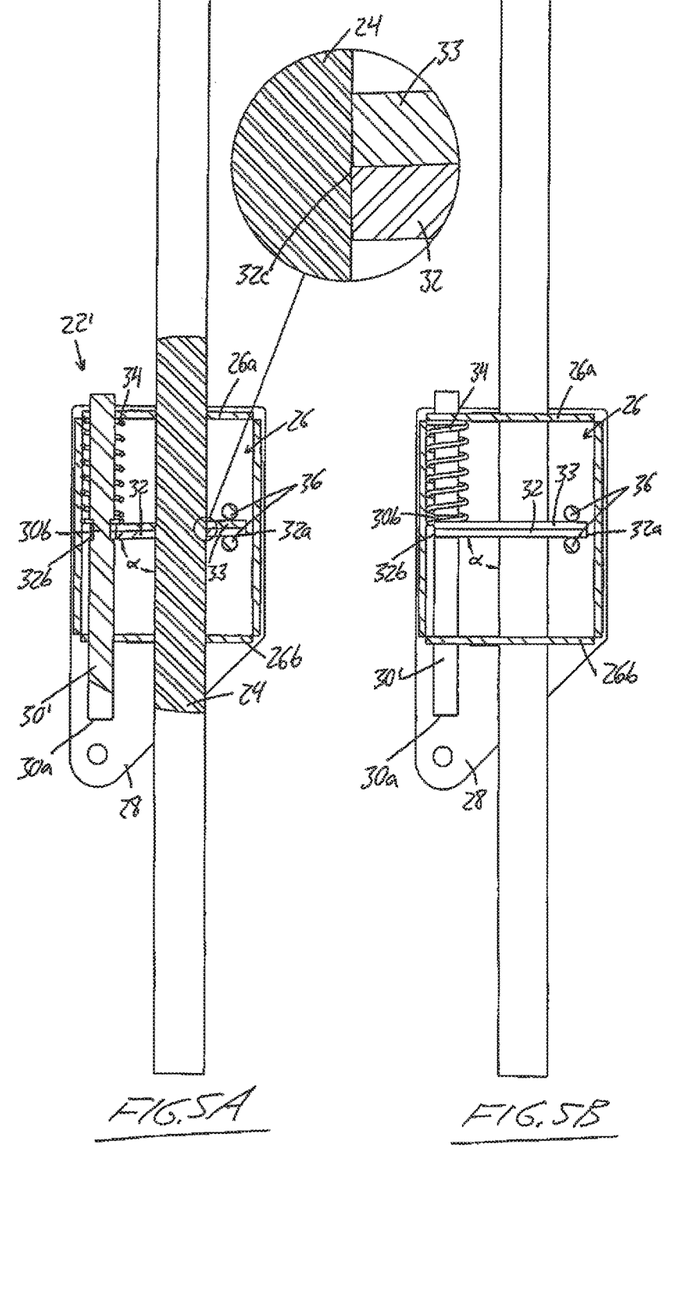
FIG. 5A is a partial cross-sectional view of the lock and release mechanism in a locked state preventing opening of the head holder.
FIG. 5B is a partial cross-sectional view of the lock and release mechanism in an unlocked state allowing opening of the head holder.

FIGS. 5A and 5B show cutaway views of the lock housing to illustrate the placement and operation of the lock components therein. From the drawings and description, it will be appreciated that the position of other lock components relative to the shaft 24 are mirrored from that of the prior art due to the inverted nature of the present lock and release mechanism relative to that of the prior art.

The shaft 24 passes fully through the lock housing via suitably sized openings in the top wall 26a, and opposing bottom wall 26b thereof. At an intermediate location between the top and bottom walls 26, 26b of the lock housing 26, a pair of locating pins 36 span horizontally through the mounting plate 28 and an opposing front wall 26c of the lock housing in a direction perpendicular to the shaft 24 and parallel to all the pivot pins of the linkage. One end of the locking plate 32 is received between these locating pins 36. The locating pins and respective end of the lock plate reside on an outer side of the shaft opposite the holding members and intermediate link. On the opposing inner side of the shaft 24, a second end of the locking plate 32 features a notch through which the release pin 30' passes as it extends through the housing via openings in the top and bottom walls 26a, 26b thereof.

The release pin 30' has a reduced-diameter portion 30b defining a circumferential recess therearound, where the notched out end of the locking plate 32 engages with the release pin 30'. The width of the notch in the locking plate is equal to, or slightly exceeds, the reduced diameter of the recessed portion 30b of the release pin, but is less than the full-diameter portions of the release pin 30' that remain intact above and below the locking plate 32. Accordingly, upward and downward displacement of the pin 30' forces the notched end of the locking plate upward and downward relative to the first end of the locking plate 32 that is constrained between the locating pins 36, as the shouldered transitions between the reduced-diameter and full diameter portions of the release pin abut against the lock plate at the intact areas on either side of the notch to force the notched end up and down during axial displacement of the release pin in opposing directions.

Between the pin-constrained first end 32a of the locking plate and the notched-out pin-engaging end 32b thereof, an opening in the locking plate accommodates passage of the shaft 24 therethrough. The opening has a diameter slightly greater than the shaft, so that when the locking plate lies perpendicular to the shaft, the shaft is freely slidable through the locking plate. This unlocked release condition is shown in FIG. 5B, where the lock plate is perpendicular to the shaft 24. However, a compression spring 34 is coiled around the release pin 30' between the locking plate 32 and the top wall 26a of the lock housing 26, and therefore normally forces the notched-out pin-engaging end 32b of the locking plate 32 downwardly, thereby tilting the locking plate 32 into a non-perpendicular orientation relative to the shaft 24. This is shown in FIG. 5A, where angle α measured between the lock plate and the shaft at the bottom of the lock plate on the inner side of the shaft is an acute angle slightly lesser than the 90-degree value of the same angle α in FIG. 5B. The degree of tilt and the size of the opening in the locking plate 32 are such that the perimeter edge 32c around the opening at the topside of the locking plate 32 bites against the outer periphery of the shaft 24, thereby locking the shaft against upward axial displacement relative to the lock housing 26 and the locking plate carried thereby. The spring 34 thus normally tilts the locking plate into its locking position, but upward axial displacement of the release pin 30' into a raised position forces the notched end 32b of the locking plate upwardly, thus pivoting the locking plate 32 about its constrained end 32a out of its tilted locking position into the release position perpendicular to the shaft 24.

While the forgoing description refers to a singular locking plate, FIGS. 5A and 5B demonstrate that there may be more than one such plate. The illustrated embodiment shows two locking plates 32, 33 residing in face-to-face adjacent relation to one another and both constrained between the same pair of locating pins 36. Accordingly, the illustrated embodiment increases the shaft-biting locking action by having two plates bite against the shaft periphery in the locking position. Accordingly, general reference is made herein to a locking member that operates in the manner described above in relation to one locking plate 32, and it will be appreciated that the overall locking member may be constituted by a singular piece, or by multiple pieces each providing a respective biting action on the shaft in the locked state of the mechanism.

With reference to FIG. 2A, to cause upward driving of the release pin 30' into its raised position overcoming the spring force to pivot the locking plate into its release position, a cam member 38 is carried on the operating lever 18' at or near its movable connection to the bottom holding member 12. A topside of the cam member 38 features an upwardly convex camming surface 38a that resides beneath the lower actuation end 30a of release pin 30' at a distance below the bottom wall 26b of the lock housing 26. This way, the lower actuation end 30a of the release pin can abut against this camming surface 32a and travel therealong. The convex camming surface is defined atop an arc-shaped end portion 38b of the camming member whose concave underside bridges over the pivot pin 28a of the lock-carrying mounting plate 28. From the arc-shaped portion 38b, a linear-reaching leg portion 38c of the cam member extends in one direction away from the shaft 24 alongside the bottom holding member 12 toward the working end 12b thereof.

Figure 3:
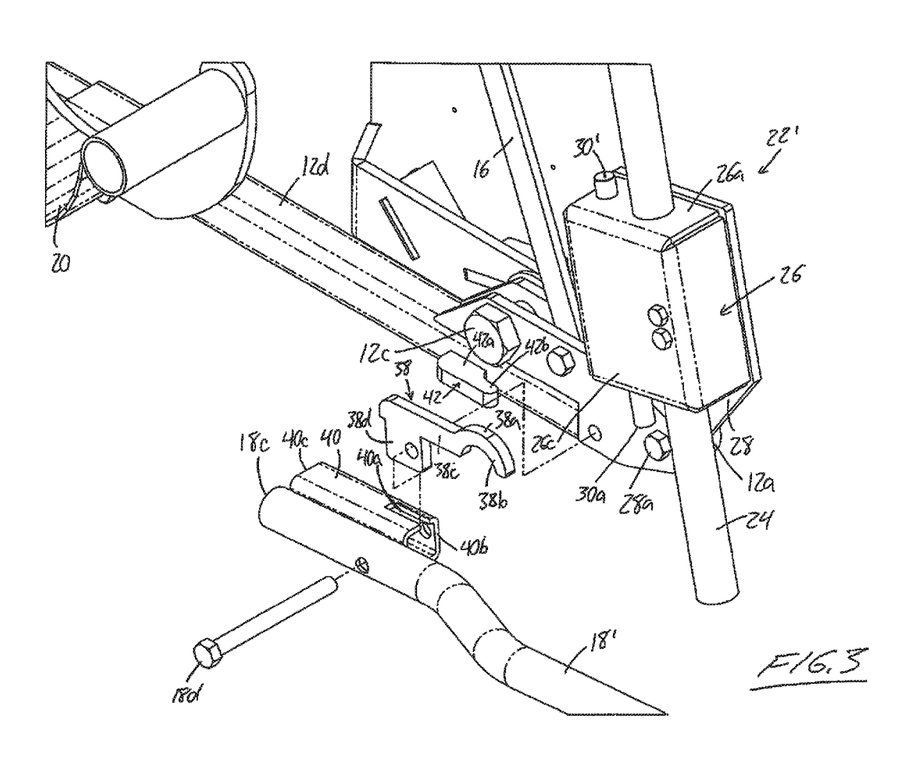
FIG. 3 is a partially exploded view of the lock and release mechanism of FIG. 2A.

Turning to the exploded view in FIG. 3, a tab-shaped mounting portion 38d depends downwardly from the linear leg portion 38c of the camming member near the distal end thereof opposite the arc-shaped end portion. The tab-like mounting portion 38d reaches downwardly through a slot 40a in the top wall of a hollow tubular member 40 at one end thereof. The tubular member 40 is affixed to the operating lever 18' at a working end 18c thereof opposite the manually operated free end thereof, and at the rear side of the lever 18' that faces toward the bottom holding member 12. The slotted end 40b of the tubular member 40 faces toward the free end 18a of the operating lever so that the slotted end faces toward the shaft 24.

The movable connection between the operating handle 18' and the bottom holding member 12 is provided by a respective pivot pin 18d that lies parallel to the other pivot pins and passes through the operating lever 18', the adjacent tubular member 40, the mounting tab portion 38d of the cam member 38, and the mounting bracket 12e of the bottom holding member 12. An L-shaped stop tab 42 protruding from the bottom holding member has a first leg 42a jutting perpendicularly out from the front side of the bottom holding member, and a second leg 42b reaching along the bottom holding member 12 toward the first end 12a thereof. The stop tab 42 is located near the bottom holding member's pivot pin 12c so as to be on the side of the operating lever pivot pint 18c opposite the first end 12a of the bottom holding member and opposite the shaft 24 and release pin 30'. The distance from the operating lever's pivot pin 18c to the nearest end of the second leg 42b of the stop tab is less the distance from the operating lever's pivot pin 18c to the unslotted distal end 40c of the tubular member 40. Accordingly, with the tubular member in its installed position pinned up against the front side of the bottom holding member, the second leg 42b of the stop tab 42 reaches into the opening at the distal end 40c of the hollow tubular member 40. The thickness of the stop tab 42 is less than the height of the tubular member 40, whereby the tubular member 40 and the operating lever 18' affixed thereto can pivot a limited degree relative to the bottom holding member 12 about the pivot pin 18d.

In the closed state of the head holder, the weight of the operating lever 18' will tend to lower the free end 18a thereof until the stop tab 42 abuts the underside of the tubular member's top wall, thus defining a default position of the operating lever relative to the bottom holding member in the closed state of the head holder. In this position, the cam member 38 carried on the operating lever 18' by the tubular member 40 has its cam surface 32a in non-forceful contact with, or closely spaced relation to, the lower actuation end 30a of the release pin 30'. However, with the apparatus in the closed state shown in FIGS. 2 and 4, initial lifting of the operating lever 18' will tilt the free end 18a upwardly relative to the bottom holding member 12, and the allowed degree of tilting between the operating lever and the bottom holding member before the bottom wall of the tubular member 40 abuts against the stop tab 42 is sufficient to force the camming surface 32a upwardly against the lower actuation end 30a of the release pin 30' and lift the release pin into a raised position forcing the locking plate 32 into its untilted release position perpendicular to the shaft. Until this release of the locking action takes place, upward lifting of the first end 12a of the bottom holding member 12 (as required to lower the opposing working end thereof about pivot pin 12c) is not possible, as the lock housing 26 carried on the bottom working member by mounting plate 28a cannot move upwardly because the tilted locking position of the locking plate in the lock housing prevents relative sliding of the lock housing 26 along the shaft 24.

However, once the operating handle 18' reaches its predetermined limit of upward tilting relative to the bottom holding member and thereby releases the locking action, the first end 12a of the bottom holding member 12 can now rise under continued lifting of the operating lever 18'. So as the bottom wall of the tubular member rises into contact with the stop tab 42, denoting the limit of its initial tilting movement, the first end 12a of the bottom holding member will be lifted upwardly about the pivot pin 12c with the operating lever 18'. So continued lifting of the operating lever 18' lifts the first end 12a of the bottom holding member 12 along with it, which lowers the working end 12b of the bottom holding member downwardly about pivot pin 12c and thereby performs the opening stroke of the linkage to withdraw the two holding members away from one another and release the animal. During this opening stroke, the convexly curved camming surface 38a of the cam member 38 maintains the release pin 30' in its raised position holding the locking plate 32 perpendicular to the shaft 24 to allow continued travel of the lock housing 26 along the shaft 24 due to the free sliding relationship between the shaft and the perpendicular lock plate. Accordingly, this allows continued lowering of the working end 12b of the bottom holding member, which in turn causes the working end 14b of the top holding member to rise under the action of the intermediate link 16 connected between the two holding members.

While the illustrated embodiment places the stop tab and cooperating hollow tubular member on the bottom holding member and operating lever, respectively, this arrangement may be reversed in order embodiments, where a stop tab on the lever reaches into a hollow part on the bottom holding member. Various other stop arrangements capable of forming predetermined limits of relative movement between the operating handle and the bottom holding member may alternatively be employed.

Figure 6:
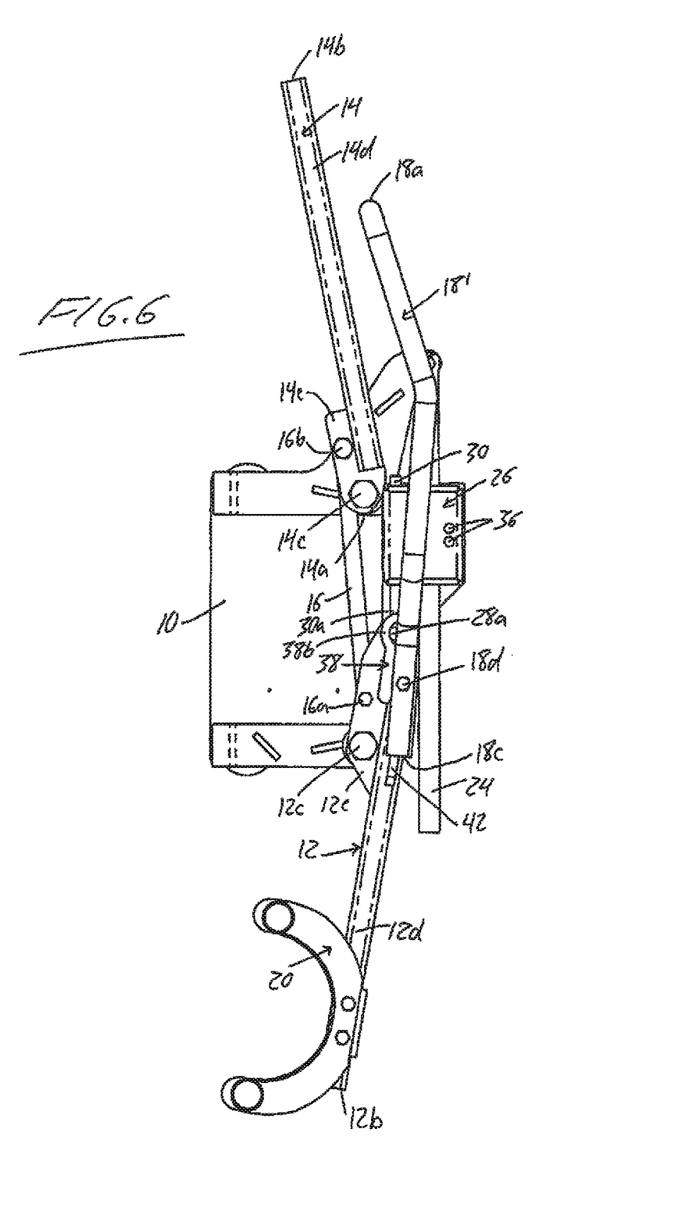
FIG. 6 is an elevational view of the livestock head holder of FIG. 2, but in its fully opened state.

FIG. 6 shows the holding apparatus in its fully opened state, where the top holding member 14 stands generally upright in a near vertical orientation, and the bottom holding member 12 hangs downward in a near vertical orientation, and the bottom actuating end 30a of the release pin has reached the terminal end of the camming surface 38a at the tip of the arc-shaped cam end 38b of the cam member. From this, it will be appreciated that the cam member 38, through continuous contact with the lower actuation end 30a of the release pin 30', maintains the unlocked state of the lock/release mechanism throughout the full opening stroke of the linkage.

From the fully opened state of FIG. 6, re-closing of the apparatus simply requires manual grasping of the free end 18a of the operating lever and pulling thereof away from the top holding member 14 and downwardly toward the ground. With reference to the close-up inset of FIG. 5A, the tilted locking position of the lock plate places the top perimeter 32c edge of the lock plate's opening into biting engagement with the shaft 24, where attempted upward displacement of the lock housing 26 along the shaft only increases the biting action of the lock plate on the shaft, thereby increasing the locking force to prevent any movement. On the other hand, during the closing stroke, where the lock housing 26 is forced downwardly along the shaft 24, relative sliding between the shaft and the biting edge 32c of the locking plate is allowed to occur. Accordingly, no user-performed lock-release action is required to enable the closing stroke.

From the forgoing, it will be appreciated that the disclosed head holder relies solely on lifting of the operating lever 18' to both unlock and open the apparatus using a singular motion or action, thereby providing notable improvement over the prior art that requires two-handed operation to release the locking action via the release pin with one hand while simultaneously lifting of the operating lever with the other hand.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:
1. A livestock head holder comprising:
    a frame;
    a linkage comprising:
        a top holding member pivotably coupled to the frame proximate a first end of the top holding member;
        a bottom holding member coupled to the frame proximate a first end of the bottom holding member;

an operating lever connected to the bottom holding member to extend outwardly from the first end thereof so that downward pulling of a free end of the operating lever performs a closing stroke of the head holder that swings an opposing working end of the bottom holding member upwardly to brace against an underside of an animal's neck; and an intermediate link having an upper end pivotably coupled to the top holding member and a lower end pivotably coupled to the bottom holding member so as to swing a working end of the top holding member downwardly during the closing stroke;

a lock and release mechanism arranged to normally prevent a reverse opening stroke of the head holder that withdraws the working ends of the top and bottom holding members away from one another to release the animal's neck, said lock and release mechanism comprising:

a shaft;

a lock carrier;

a locking member carried by the lock carrier, said locking member having an opening through which the shaft extends and being biased into a tilted locking position in which a perimeter edge of the opening is in biting engagement with the shaft;

a release member arranged to force the locking member out of the tilted locking position during initial raising of the free end of the operating lever and into a release position disengaged from the shaft; and a cam carried on the operating lever and arranged to act against the release member in a direction forcing the locking member out of the tilted locking position and into the release position during the initial raising of the free end of the operating lever to enable completion of the reverse opening stroke, wherein the cam comprises a concave curvature at a camming surface thereof over which the release member travels during the reverse opening stroke to maintain the locking member in the release position throughout said reverse opening stroke.

2. The livestock head holder of claim 1 wherein the release member reaches downwardly from the locking member toward the bottom holding member to receive an upward force on the release member at a lower end thereof during said initial raising of the free end of the operating lever.

3. The livestock head holder of claim 1 wherein the shaft has a pivotable connection to the frame and hangs downwardly from said pivotable connection, the lock carrier is pivotably coupled to the bottom holding member, and the tilted locking position of the locking member blocks upward sliding of the lock carrier along the shaft.

4. The livestock head holder of claim 1 wherein the operating lever is arranged for limited upward tilting of the free end thereof relative to the bottom holding member to a predetermined limit at which the bottom holding member starts moving with the operating lever to initiate the reverse opening stroke, said limited upward tilting acting to release the lock and release mechanism and allow the reverse opening stroke.

5. The livestock head holder of claim 4 wherein the operating lever is pivotably pinned to the bottom holding member to enable the limited upward tilting of the operating lever relative thereto.

6. The livestock head holder of claim 4 comprising a protruding stop and a cooperating opening each defined on a respective one of either said bottom holding member or said operating lever, the protruding stop reaching into the cooperating opening and being sized and shaped relative thereto to allow but limit the upward tilting of the operating lever relative to the bottom holding member.

7. The livestock head holder of claim 6 wherein the cooperating opening is defined by an end of a hollow tubular member affixed to the respective one of either said bottom holding member or said operating lever.

8. The livestock head holder of claim 6 wherein the protruding stop is an L-shaped stop-having a first leg protruding outwardly from said respective one of either said bottom holding member or said operating lever, and a second leg reaching along said respective one of either said bottom holding member or said operating lever.

9. The livestock head holder of claim 6 wherein the protruding stop is defined on the bottom holding member and the cooperating opening is defined on the operating lever.

10. The livestock head holder of claim 1 wherein the operating lever is arranged for upward tilting of the free end thereof relative to the bottom holding member to a predetermined limit at which the bottom holding member starts moving with the operating lever to initiate the reverse opening stroke, said limited upward tilting acting to drive the release member to a raised position, forcing the locking member out of the tilted locking position and into the release position.

11. A livestock head holder comprising:

a frame;

a top holding member pivotably coupled to the frame proximate a first end of the top holding member;

a bottom holding member coupled to the frame proximate a first end of the bottom holding member;

an operating lever connected to the bottom holding member to extend outwardly from the first end thereof so that downward pulling of a free end of the operating lever performs a closing stroke of the head holder that swings an opposing working end of the holding member upwardly to brace against an underside of an animal's neck; and an intermediate link having an upper end pivotably coupled to the top holding member and a lower end pivotably coupled to the bottom holding member so as to swing a working end of the top holding member downwardly during the closing stroke actuated by the operating lever;

a lock and release mechanism comprising:

a shaft having a pivotable connection to the frame and hanging downwardly from said pivotable connection;

a lock carrier pivotably coupled to the bottom holding member;

a locking member carried by the lock carrier, said locking member having an opening through which the shaft extends and being biased into a tilted locking position in which a perimeter edge of the opening bites onto the shaft to prevent upward sliding of the lock carrier along the shaft and thereby prevent movement of the linkage in a reverse opening stroke;

a release member engaged with the locking member and reaching downwardly from the locking member toward the bottom holding member; and a cam carried by the operating lever and having a camming surface facing the release member for contact with a lower end thereof to act upwardly thereagainst during initial raising of the free end of the operating lever to thereby lift the release member into a raised position forcing the locking member out of the tilted locking position and into a release position allowing initiation of the reverse opening stroke, said camming surface being shaped to maintain the raised position of the release member and the release position of the locking member throughout continued raising of the free end of the operating lever to complete the reverse opening stroke.

12. The livestock head holder of claim 11 wherein the operating lever is arranged for limited upward tilting of the free end thereof relative to the bottom holding member to a predetermined limit at which the bottom holding member starts moving with the operating lever to initiate the reverse opening stroke, said limited upward tilting acting to force the cam against the release member and thereby release the locking member from the locking position.

13. The livestock head holder of claim 12 wherein the operating lever is pivotably pinned to the bottom holding member to enable the limited upward tilting of the operating lever relative thereto.

14. The livestock head holder claim 11 comprising a protruding stop and a cooperating opening defined on a respective one of either said bottom holding member or said operating lever, the protruding stop reaching into the cooperating opening and being sized and shaped relative thereto to allow but limit the upward tilting of the operating lever.

15. The livestock head holder of claim 14 wherein the opening is defined by an end of a hollow tubular member affixed to the respective one of either the bottom holding member or the operating lever.

16. The livestock head holder of claim 14 wherein the protruding stop is an L-shaped stop having a first leg protruding outwardly from said respective one of either said bottom holding member or said operating lever, and a second leg reaching along said respective one of either said bottom holding member or said operating lever.

17. The livestock head holder of claim 14 wherein the protruding stop is defined on the bottom holding member and the cooperating opening is defined on the operating lever.

18. A livestock head holder comprising:
a frame;
a linkage comprising:
   a top holding member pivotably coupled to the frame proximate a first end of the top holding member;
   a bottom holding member coupled to the frame proximate a first end of the bottom holding member;
   an operating lever connected to the bottom holding member to extend outwardly from the first end thereof so that downward pulling of a free end of the operating lever performs a closing stroke of the head holder that swings an opposing working end of the bottom holding member upwardly to brace against an underside of an animal's neck; and
   an intermediate link having an upper end pivotably coupled to the top holding member and a lower end pivotably coupled to the bottom holding member so as to swing a working end of the top holding member downwardly during the closing stroke;
a lock and release mechanism comprising a lock arranged to normally prevent a reverse opening stroke of the head holder that withdraws the working ends of the top and bottom holding members away from one another to release the animal's neck;
wherein:
   the operating lever is arranged for limited upward tilting of the free end thereof relative to the bottom holding member to a predetermined limit at which the lock is released and the bottom holding member starts moving with the operating lever to initiate the reverse opening stroke;
   a protruding stop and a cooperating opening are each defined on a respective one of either said bottom holding member or said operating lever, the protruding stop reaching into the cooperating opening and being sized and shaped relative thereto to allow but limit the upward tilting of the operating lever relative to the bottom holding member; and
   the protruding stop is an L-shaped stop having a first leg protruding outwardly from said respective one of either said bottom holding member or said operating lever, and a second leg reaching along said respective one of either said bottom holding member or said operating lever.

19. The livestock head holder of claim 18 wherein the cooperating opening is defined by an end of a hollow tubular member affixed to the respective one of either said bottom holding member or said operating lever.

20. The livestock head holder of claim 18 wherein the protruding stop is defined on the bottom holding member and the cooperating opening is defined on the operating lever.

* * * * *

UNITED STATES PATENT AND TRADEMARK OFFICE
CERTIFICATE OF CORRECTION

PATENT NO. : 10,039,262 B2
APPLICATION NO. : 15/797403
DATED : August 7, 2018
INVENTOR(S) : Philip Malcolm Firth It is certified that error appears in the above-identified patent and that said Letters Patent is hereby corrected as shown below:

In the Specification

Column 3, Line 34, the expression "concave curvature" should read --convex curvature--.

In the Claims

Claim 1, Column 11, Line 36, the expression "concave curvature" should read --convex curvature--.

Signed and Sealed this
Fifteenth Day of January, 2019

Andrei Iancu
*Director of the United States Patent and Trademark Office*